United States Patent
Wang et al.

(10) Patent No.: US 9,888,208 B2
(45) Date of Patent: Feb. 6, 2018

(54) METHOD AND APPARATUS FOR EXCHANGING ENDPOINT INFORMATION, AND TELEPRESENCE ENDPOINT

(71) Applicant: ZTE Corporation, Shenzhen (CN)

(72) Inventors: Liang Wang, Shenzhen (CN); Xiaoyang Ye, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 15/025,608

(22) PCT Filed: Apr. 21, 2014

(86) PCT No.: PCT/CN2014/075845
§ 371 (c)(1),
(2) Date: Mar. 29, 2016

(87) PCT Pub. No.: WO2014/176996
PCT Pub. Date: Nov. 6, 2014

(65) Prior Publication Data
US 2016/0241810 A1    Aug. 18, 2016

(30) Foreign Application Priority Data
Sep. 29, 2013 (CN) .......................... 2013 1 0456906

(51) Int. Cl.
*H04N 7/15*     (2006.01)
*H04N 7/14*     (2006.01)
*H04L 29/06*    (2006.01)

(52) U.S. Cl.
CPC ......... *H04N 7/147* (2013.01); *H04L 65/1059* (2013.01); *H04L 65/1069* (2013.01);
(Continued)

(58) Field of Classification Search
None
See application file for complete search history.

(56) References Cited

U.S. PATENT DOCUMENTS 7,805,534 B2 *  9/2010  Toutain ............... H04M 3/4872
                                                        709/231
7,929,553 B2 *  4/2011  Diab .................. H04N 7/15
                                                        370/401
(Continued)

FOREIGN PATENT DOCUMENTS

CN    101867770 A    10/2010
CN    102868880 A    1/2013
(Continued)

OTHER PUBLICATIONS

International Search Report for corresponding Application No. PCT/CN2014/075845 filed on Apr. 21, 2014; dated Jul. 14, 2014.
(Continued)

*Primary Examiner* — Creighton Smith
(74) *Attorney, Agent, or Firm* — Cantor Colburn LLP

(57) ABSTRACT

Provided are a method and apparatus for exchanging endpoint information, and a telepresence endpoint. According to the method, telepresence indicator information is exchanged between telepresence endpoints, so that endpoints in a telepresence system can obtain capability characteristics from each other. By means of the technical solution, the problems in the related art that requirements of the telepresence system cannot be supported and the compatibility between the telepresence system and a traditional video conference system cannot be realized are solved, unnecessary exchange between the endpoints is avoided, and the effects of meeting new demands of the telepresence system and improving the efficiency of media stream transport between the endpoints are further achieved.

6 Claims, 7 Drawing Sheets

(52) U.S. Cl.
CPC ............ *H04L 65/403* (2013.01); *H04L 69/24* (2013.01); *H04N 7/15* (2013.01)

(56) References Cited

U.S. PATENT DOCUMENTS

| | | | | |
|---|---|---|---|---|
| 2002/0061059 | A1* | 5/2002 | Ginesi | H04L 5/0046 375/219 |
| 2008/0002020 | A1* | 1/2008 | Choi | H04N 7/147 348/14.02 |
| 2008/0045209 | A1* | 2/2008 | Mo | H04M 3/42017 455/433 |
| 2010/0321464 | A1* | 12/2010 | Jiang | H04N 7/147 348/14.02 |
| 2014/0139618 | A1* | 5/2014 | Ye | H04N 7/147 348/14.09 |
| 2015/0215159 | A1* | 7/2015 | Liao | H04L 5/1438 370/225 |
| 2015/0341696 | A1* | 11/2015 | Redmann | H04N 7/15 725/86 |
| 2017/0163434 | A1* | 6/2017 | Bathurst | H04L 12/1827 |

FOREIGN PATENT DOCUMENTS

| | | |
|---|---|---|
| CN | 102883131 A | 1/2013 |
| EP | 2285068 A1 | 2/2011 |
| EP | 2509311 A1 | 10/2012 |
| EP | 3051766 A1 | 8/2016 |

OTHER PUBLICATIONS

Anonymous, "Telepresence Interoperability Protocol (TIP) Version 8.0", Jun. 14, 2012, Retrieved for Internet: URL:http://portal.imc. org/DesktopModules/Inventures_Document/FileDownload. aspx?ContentID=21242, XP055296395.

European Search Report for corresponding application 14 792 154.8; Report dated Aug. 26, 2016.

* cited by examiner

METHOD AND APPARATUS FOR EXCHANGING ENDPOINT INFORMATION, AND TELEPRESENCE ENDPOINT

TECHNICAL FIELD

The present disclosure relates to the field of communications, and in particular to a method and apparatus for exchanging endpoint information, and a telepresence endpoint.

BACKGROUND

A video conference system adopts an existing protocol stack, the transport of one path of main video stream between endpoints is supported, while the transport of multiple paths of main video streams is not supported, and the requirement for capture features of each stream, for example, the spatial areas in which a camera captures video streams, is not described either. An improvement of the video conference system is made when a telepresence system is designed, for example, the transport of multiple paths of media streams is supported, and the capture features of each stream are described. The related art has not proposed a solution on how to support new demands of the telepresence system on the basis of adopting the existing protocol stack and how to realize the compatibility between the telepresence system and the video conference system.

Thus, the problems on how to meet the requirements of the telepresence system based on the existing protocol stack and how to realize the compatibility between the telepresence system and the video conference system remain unsolved in the related art.

SUMMARY

The embodiments of the present disclosure provide a method and apparatus for exchanging endpoint information, and a telepresence endpoint, which are intended to at least solve the problems in the related art on how to meet the requirements of the telepresence system based on the existing protocol stack and how to realize the compatibility between the telepresence system and the video conference system.

According to one aspect of the embodiments of the prevent disclosure, a method for exchanging endpoint information is provided, which may include that: telepresence indicator information is exchanged between telepresence endpoints.

Preferably, the telepresence indicator information may include at least one of: an endpoint type used for indicating that an endpoint is a telepresence endpoint, information of a transport channel which is to be used for transporting a telepresence capacity set of the endpoint, and number of media streams received by the telepresence endpoint.

Preferably, the telepresence indicator information may be exchanged between the telepresence endpoints in at least one of the following modes: exchanging the telepresence indicator information between the telepresence endpoints when the telepresence endpoints are exchanging terminal capability sets; and exchanging the telepresence indicator information between the telepresence endpoints when the telepresence endpoints are setting up a call.

Preferably, after the telepresence indicator information is exchanged between the telepresence endpoints, the method may further include that: telepresence capability negotiation is performed between the telepresence endpoints according to an exchange result of the telepresence indicator information.

According to another aspect of the embodiment of the present disclosure, an apparatus for exchanging endpoint information is provided, which may be applied to a telepresence endpoint and may include: an exchanging component, which is configured to exchange telepresence indicator information.

Preferably, the exchanging component may include at least one of: a first exchanging unit, which is configured to exchange the telepresence indicator information when terminal capability sets are being exchanged; and a second exchanging unit, which is configured to exchange the telepresence indicator information when the telepresence endpoints are setting up a call.

Preferably, the apparatus may further include: a capability negotiation component, which is configured to perform telepresence capability negotiation according to an exchange result of the telepresence indicator information.

According to still another aspect of the embodiments of the present disclosure, a telepresence endpoint is provided, which may include the apparatus according to any one of the contents mentioned above.

By means of some embodiments of the present disclosure, the telepresence indicator information is exchanged between the telepresence endpoints, so that the endpoints in the telepresence system can obtain capability characteristics from each other. In this way, the problems in the related art that the requirements of the telepresence system cannot be supported and the compatibility between the telepresence system and the traditional video conference system cannot be realized are solved, unnecessary exchange between the endpoints is avoided, and the effects of meeting new demands of the telepresence system and improving the efficiency of media stream transport between the endpoints are further achieved.

BRIEF DESCRIPTION OF THE DRAWINGS

The drawings described here are intended to provide further understanding of the embodiments of the present disclosure, and form a part of the present application. The schematic embodiments and descriptions of the embodiments are intended to explain the embodiments of the present disclosure, and do not form improper limits to the present disclosure. In the drawings.

DETAILED DESCRIPTION OF THE EMBODIMENTS

The technical solution is described below with reference to the drawings and the embodiments in detail. It is important to note that the embodiments of the present disclosure and the characteristics in the embodiments can be combined under the condition of no conflict.

Figure 1:
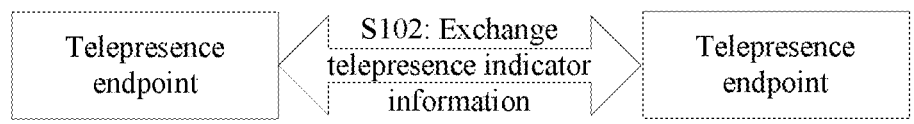
FIG. 1 is a flowchart of a method for exchanging endpoint information according to an embodiment of the present disclosure.

In the embodiment, a method for exchanging endpoint information is provided. FIG. 1 is a flowchart of a method for exchanging endpoint information according to an embodiment of the present disclosure. As shown in FIG. 1, the flow includes the steps as follows.

Step S102: Telepresence indicator information is exchanged between telepresence endpoints.

Due to no exchange of capability features of the endpoints in the related art, the requirements of the telepresence system cannot be supported, and the compatibility between the telepresence system and the traditional video conference system cannot be realized. By means of the above step, the telepresence indicator information is exchanged between the telepresence endpoints, so that the endpoints in the telepresence system can obtain the capability features from each other, unnecessary exchange between the endpoints is avoided, and the effects of meeting new demands of the telepresence system and improving the efficiency of media stream transport between the endpoints are further achieved.

It is important to note that the telepresence indicator information may include at least one of: an endpoint type used for indicating that an endpoint is a telepresence endpoint; information of a transport channel which is to be used for transporting a telepresence capacity set of the endpoint, for example, information used for creating a new signalling channel, including a channel transport protocol, an Internet Protocol (IP) address and/or port information for instance; and the number of media streams received by the telepresence endpoint, which may be, for example, the number of displays at a receiving end or the number of streams capable of being received by the receiving end.

The telepresence indicator information may be exchanged between the telepresence endpoints in multiple modes. For example, the telepresence indicator information may be exchanged between the telepresence endpoints in at least one of the following modes: exchanging the telepresence indicator information between the telepresence endpoints when the telepresence endpoints are exchanging terminal capability sets; and exchanging the telepresence indicator information between the telepresence endpoints when the telepresence endpoints are setting up a call. It is important to note that other possible exchange modes may also be adopted for the exchange of the telepresence indicator information between the telepresence endpoints, separate illustration for the other possible exchange modes will not be given here.

Preferably, after the telepresence indicator information is exchanged between the telepresence endpoints, telepresence capability negotiation may be performed between the telepresence endpoints according to an exchange result of the telepresence indicator information. For example, after the features of the endpoints are obtained, telepresence capability negotiation may be performed according to obtained feature parameters of the opposite endpoint, and media stream transport may be performed after negotiation according to a telepresence capability negotiation result.

In another embodiment, an apparatus for exchanging endpoint information is provided. The apparatus is configured to realize the embodiments and the preferred implementation modes, and the described embodiments and preferred implementation modes are no longer described in detail. Just as a term 'component' used below, the combination of software and/or hardware with predetermined functions can be realized. Although the apparatus described by the following embodiment is better realized by the software, the realization of the hardware and the combination of the software and the hardware may be possible and may be constructed.

Figure 2:
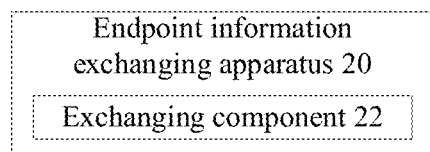
FIG. 2 is a structure block diagram of an apparatus for exchanging endpoint information according to an embodiment of the present disclosure.

FIG. 2 is a structure block diagram of an apparatus for exchanging endpoint information according to an embodiment of the present disclosure. As shown in FIG. 2, the apparatus for exchanging endpoint information 20 is applied to a telepresence endpoint and includes an exchanging component 22. The apparatus for exchanging endpoint information 20 is described below.

The exchanging component 22 is configured to exchange telepresence indicator information.

Figure 3:
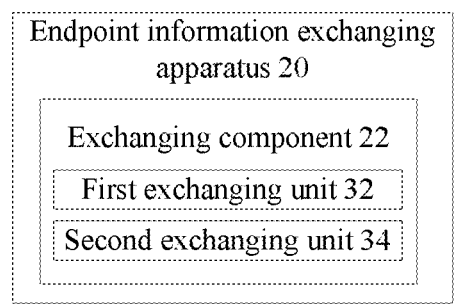
FIG. 3 is a preferred structure block diagram of an exchanging component 22 in an apparatus for exchanging endpoint information according to an embodiment of the present disclosure.

FIG. 3 is a preferred structure block diagram of an exchanging component 22 in an apparatus for exchanging endpoint information according to an embodiment of the present disclosure. As shown in FIG. 3, the exchanging component 22 may include at least one of:

a first exchanging unit 32, which is configured to exchange the telepresence indicator information when terminal capability sets are being exchanged; and a second exchanging unit 34, which is configured to exchange the telepresence indicator information when a call is being set up.

Figure 4:
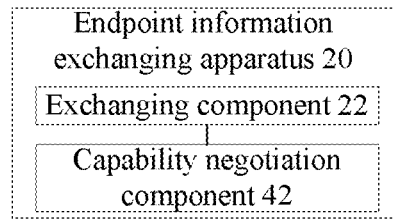
FIG. 4 is a preferred structure block diagram of an apparatus for exchanging endpoint information according to an embodiment of the present disclosure.

FIG. 4 is a preferred structure block diagram of an apparatus for exchanging endpoint information according to an embodiment of the present disclosure. As shown in FIG. 4, the apparatus may further include a capability negotiation component 42 in addition to all the components shown in FIG. 2, and the capability negotiation component 42 is described below.

The capability negotiation component 42 is coupled to the exchanging component 22 and is configured to perform telepresence capability negotiation according to an exchange result of the telepresence indicator information.

Figure 5:
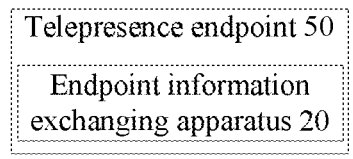
FIG. 5 is a structure block diagram of a telepresence endpoint according to an embodiment of the present disclosure.

FIG. 5 is a structure block diagram of a telepresence endpoint according to an embodiment of the present disclosure. As shown in FIG. 5, the telepresence endpoint 50 may include the apparatus for exchanging endpoint information 20 according to any one of the contents mentioned above.

In the embodiment, indicators are given to the telepresence endpoints in order to address the problems on how to meet the new demands of the telepresence system based on the existing protocol stack and how to realize the compatibility between the telepresence system and the video conference system in the related art. Due to the indicators to the telepresence endpoints, the telepresence endpoint can determine whether the opposite end is a telepresence endpoint and can decide how to execute the following flow. In the embodiment, the following indicating solution for the telepresence endpoints is provided.

Figure 6:
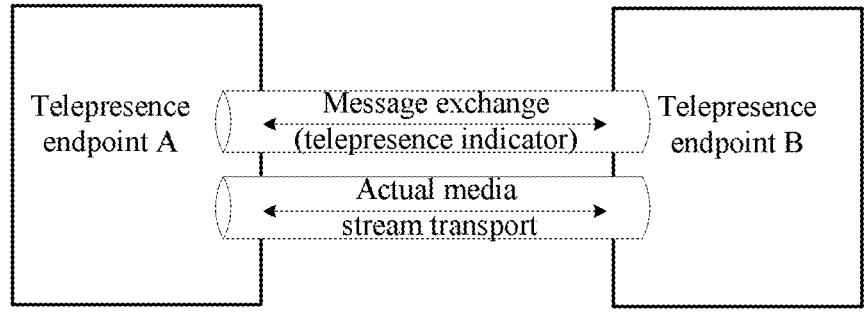
FIG. 6 is a diagram showing exchange of telepresence indicator information between telepresence endpoints when the telepresence endpoints are exchanging messages according to an embodiment of the present disclosure.

FIG. 6 is a diagram showing exchange of telepresence indicator information between telepresence endpoints when the telepresence endpoints are exchanging messages according to an embodiment of the present disclosure. As shown in FIG. 6, the telepresence endpoints give indicators to each other, as an example implementation, the telepresence endpoints may give the indicators to each other during signalling exchange.

Figure 7:
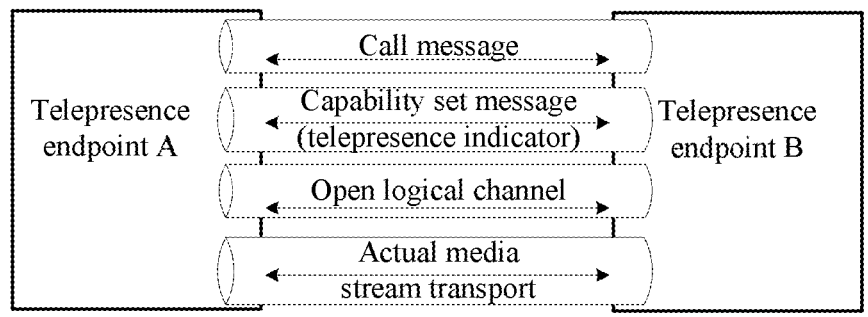
FIG. 7 is a diagram showing exchange of telepresence indicator information between telepresence endpoints when the telepresence endpoints are exchanging terminal capability set messages according to an embodiment of the present disclosure.

FIG. 7 is a diagram showing exchange of telepresence indicator information between telepresence endpoints when the telepresence endpoints are exchanging terminal capability set messages according to an embodiment of the present disclosure. As shown in FIG. 7, the telepresence endpoints may give telepresence indicators in terminal capability set messages. For example, a telepresence endpoint may give the telepresence indicator when sending a terminal capability set message, and may alternatively give the telepresence indicator when sending an acknowledge message acknowledging that a terminal capability set message has been received.

Figure 8:
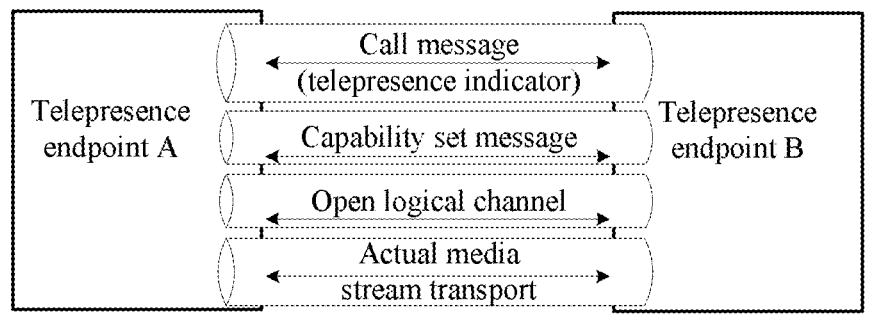
FIG. 8 is a diagram showing exchange of telepresence indicator information between telepresence endpoints when the telepresence endpoints are setting up a call according to an embodiment of the present disclosure.

FIG. 8 is a diagram showing exchange of telepresence indicator information between telepresence endpoints when the telepresence endpoints are setting up a call according to an embodiment of the present disclosure. As shown in FIG. 8, the telepresence endpoints may give the telepresence indicators in a call setup flow. For example, the telepresence endpoints may give the telepresence indicators in call messages by using a GEF in H.323. A sending end may give a telepresence indicator in a setup message, and a receiving end may give an indicator in an Altering message or a Connect message.

It is important to note that the telepresence indicator information may include at least one of: an endpoint type, channel attribute information of a new channel which is to be used for transporting a telepresence capability set, and the number of media streams received by the telepresence endpoint. Each parameter is described below.

The endpoint type may be used for indicating that the endpoint is a telepresence endpoint. The information may be explicitly shown by using a field or may be implicitly shown by other pieces of information. For example, the endpoint type may be shown by attribute of a new channel for bearing telepresence capability set, that is, when the endpoint transports the telepresence capability set through a new channel for bearing the telepresence capability set, it means that the endpoint is a telepresence endpoint. Certainly, any one of the two modes, i.e., explicitly showing the endpoint type via the field and implicitly showing by attribute of a new channel for bearing telepresence capability set, may be selected to show that the endpoint is the telepresence endpoint.

Information of a new channel for bearing a telepresence capability set is used for indicating a new channel transport mechanism for bearing a telepresence endpoint capability set. For example, the information may include at least one of: a channel transport protocol, an IP address, port information and the like.

When the telepresence endpoint capability set is transported by using the new channel, this parameter about the information of the new channel may be directly used to show that the endpoint is a telepresence endpoint, so that the endpoint type parameter is omitted.

If the telepresence endpoint capability set is transferred by using an H.245 channel, the parameter about the information of the new channel may not be sent, and the endpoint type is adopted to indicate that the endpoint is the telepresence endpoint.

The number of the received media streams may be the number of the displays at the receiving end or may be the number of the streams capable of being received by the receiving end. The number is used for controlling the length of a telepresence endpoint capability message.

When there is no telepresence indicator, it means that the endpoint is not a telepresence endpoint.

The preferred implementation modes of the present disclosure are described below with reference to a media call flow.

A substantial flow of completing a media call via the endpoints may be divided into a call flow, a capability set exchange flow, a media stream transport channel (logical channel) preparation flow and an actual media stream transport flow.

Preferred embodiment 1: H.323-based telepresence endpoints give telepresence indicators when the terminal capability set messages are being exchanged.

By means of the method, an existing H.323 protocol stack may be completely adopted, and the call flow does not need to be amended when endpoint indicators need to be changed.

Figure 9:
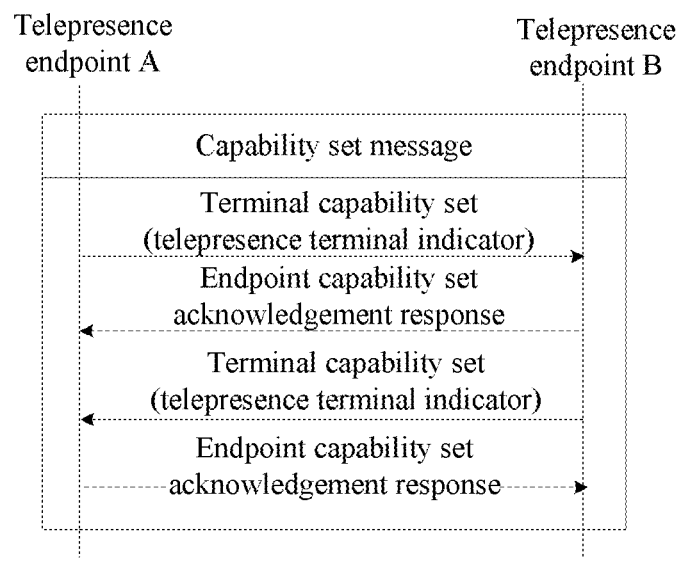
FIG. 9 is a flowchart showing exchange of telepresence indicators when H.323-based telepresence endpoints are exchanging terminal capability set messages according to a preferred embodiment of the present disclosure.

FIG. 9 is a flowchart showing exchange of telepresence indicators when H.323-based telepresence endpoints are exchanging terminal capability set messages according to a preferred embodiment of the present disclosure. As shown in FIG. 9, an endpoint A and an endpoint B are telepresence endpoints. The flow includes the steps as follows.

Step S902: The endpoint A sends a terminal capability set message (TerminalCapabilitySet) carrying a telepresence indicator to the endpoint B; and after receiving the message sent by the endpoint A, the endpoint B notices through parsing the existence of an endpoint indicator so as to determine that the endpoint A is a telepresence endpoint.

Step S904: The endpoint B sends an endpoint capability set acknowledgement response (TerminalCapabilitySetAck) message to the endpoint A.

Step S906: The endpoint B sends a terminal capability set message (TerminalCapabilitySet) carrying a telepresence indicator to the endpoint A; and after receiving the message sent by the endpoint B, the endpoint A notices through parsing the existence of an endpoint indicator so as to determine that the endpoint B is a telepresence endpoint.

Step S908: The endpoint A sends an endpoint capability set acknowledgement response (TerminalCapabilitySetAck) message to the endpoint B. After the entire interaction is completed, capability set exchange based on the telepresence endpoints may be started.

Figure 10:
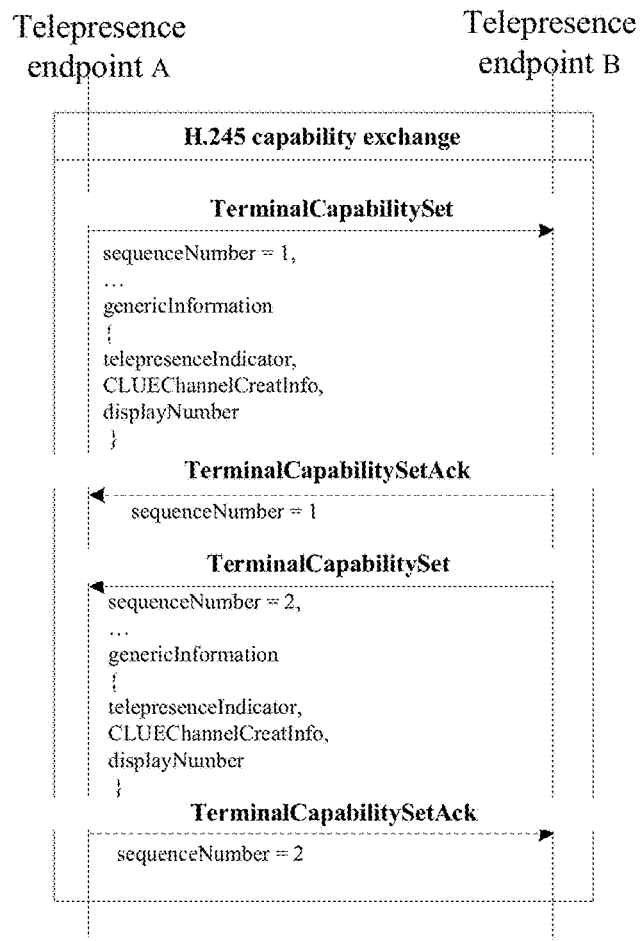
FIG. 10 is a flowchart showing exchange of telepresence indicators between H.323-based telepresence endpoints by using generic parameters according to an embodiment of the present disclosure.

FIG. 10 is a flowchart showing exchange of telepresence indicators between H.323-based telepresence endpoints by using generic parameters according to an embodiment of the present disclosure. As shown in FIG. 10, FIG. 10 shows a flow substantially similar to that shown in FIG. 9. The endpoint A and the endpoint B are telepresence endpoints. A difference between the flows shown in FIG. 10 and FIG. 9 lies in that the endpoints can give the telepresence indicators to each other in the terminal capability set message by using a generic parameter. For example, in FIG. 10, the process of sending the terminal capability set message from the telepresence endpoint A to the telepresence endpoint B includes the following contents:

```
sequenceNumber=1,
...
genericParameter {
  telepresenceIndicator,
  CLUEChannelCreatInfo,
  displayNumber
}
```

The endpoint capability set acknowledgement response acknowledging that the endpoint capability set from the telepresence endpoint A has been received by the telepresence endpoint B includes: sequenceNumber=1. The process of sending the terminal capability set message from the telepresence endpoint B to the telepresence endpoint A includes the following contents:

```
sequenceNumber=2,
...
genericParameter {
  telepresenceIndicator,
  CLUEChannelCreatInfo,
  displayNumber
}
``` endpoint capability set acknowledgement response acknowledging that the endpoint capability set from the telepresence endpoint B has been received by the telepresence endpoint A includes:
sequenceNumber=2.

FIG. 10 contains the endpoint type, attribute of the channel for bearing the telepresence endpoint capability set and the number of the media streams needed by the receiving end. The indicators may be selected as needed in practice. If an H.323 device transfers a telepresence capability set by using an H.245 channel, it is unnecessary to carry a new channel attribute (here, the new channel may be a CLUE channel defined by an Internet Engineering Task Force (IETF)). If the telepresence capability set is transferred by using the new channel, it is unnecessary to separately carry the endpoint type. Here, the number of the media streams needed by the receiving end may be the number of the displays. Certainly, as mentioned above, the number of the media streams needed by the receiving end may alternatively be the number of the streams capable of being received by the receiving end.

Figure 11:
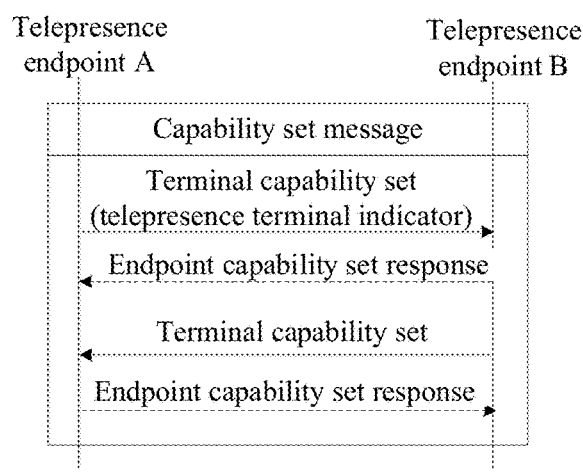
FIG. 11 is a flowchart showing the realization of compatibility between new and old H.323-based devices according to an embodiment of the present disclosure.

Preferred embodiment 2: realization of compatibility between new and old devices when H.323-based endpoints give the telepresence indicators during the sending of the terminal capability set messages FIG. 11 is a flowchart showing the realization of compatibility between new and old H.323-based devices according to an embodiment of the present disclosure. As shown in FIG. 11, the endpoint A is a new telepresence endpoint, while the endpoint B is an old video conference endpoint. The flow includes the steps as follows.

Step S1102: The endpoint A sends a terminal capability set message (TerminalCapabilitySet) carrying a telepresence indicator to the endpoint B.

Step S1104: The endpoint B cannot recognize indicator contents, and returns an endpoint capability set response TerminalCapabilitySetAck to the endpoint A.

Step S1106: The endpoint B sends an endpoint capability set to the endpoint A.

Step S1108: The endpoint A analyzes that there is no telepresence indicator, determines that the endpoint B is a traditional device, and returns a response to the endpoint B. Then, the endpoint A and the endpoint B perform exchange flow of the traditional device instead of exchange of the telepresence endpoint capability set.

Preferred embodiment 3: telepresence indicators are exchanged between H.323-based telepresence endpoints when the telepresence endpoints are setting up a call.

It is important to note that by means of the method, the telepresence indicators will be given in the call message by the endpoints, in this way, the opposite ends are informed that this call is a telepresence call as early as possible so as to be prepared for the compatibility between video conference devices. When the method is adopted, if a message passes through a Gate Keeper (GK), the indicator parts may be altered or deleted by the GK.

For example, when the H.323-based telepresence endpoints send the call message, the sending end may give an indicator in a Setup message, and the receiving end may give an indicator in an Altering message or a Connect message.

Figure 12:
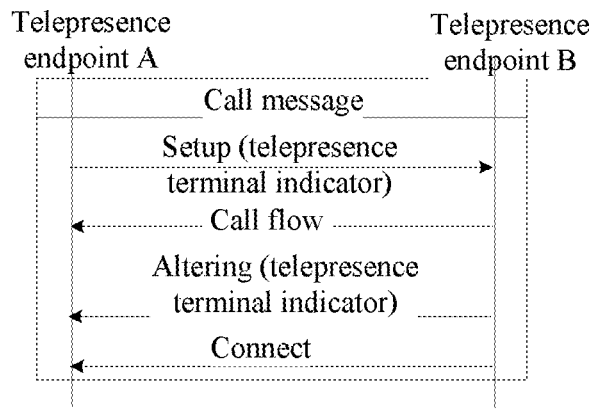
FIG. 12 is a flowchart showing exchange of a telepresence indicator 1 between H.323-based telepresence endpoints when the telepresence endpoints are setting up a call according to an embodiment of the present disclosure.

FIG. 12 is a flowchart showing exchange of a telepresence indicator 1 between H.323-based telepresence endpoints when the telepresence endpoints are setting up a call according to an embodiment of the present disclosure. As shown in FIG. 12, the endpoint A and the endpoint B are telepresence endpoints. The flow includes the steps as follows.

Step S1202: The endpoint A sends a Setup message to the endpoint B, wherein a telepresence indicator is carried in the Setup message, and after receiving the setup message, the endpoint B analyzes that the endpoint A is a telepresence endpoint.

Step S1204: The endpoint B sends a Call proceeding message to the endpoint A.

Step S1206: An Altering message carrying telepresence indicator is sent to the endpoint A, and after receiving the Altering message, the endpoint A analyzes that the endpoint B is a telepresence endpoint.

Step S1208: The endpoint B sends a Connect message to the endpoint A. Then, the two endpoints perform message interaction between the telepresence endpoints.

Figure 13:
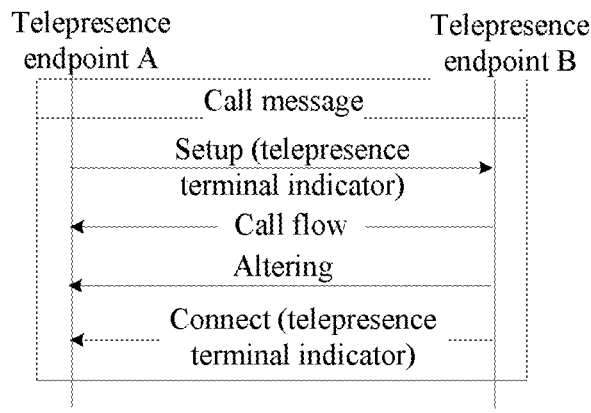
FIG. 13 is a flowchart showing exchange of a telepresence indicator 2 between H.323-based telepresence endpoints when the telepresence endpoints are setting up a call according to an embodiment of the present disclosure.

FIG. 13 is a flowchart showing exchange of a telepresence indicator 2 between H.323-based telepresence endpoints when the telepresence endpoints are setting up a call according to an embodiment of the present disclosure. As shown in FIG. 13, the endpoint A and the endpoint B are telepresence endpoints. The flow includes the steps as follows.

Step S1302: The endpoint A sends a Setup message to the endpoint B, wherein a telepresence indicator may be carried in the Setup message, and after receiving the setup message, the endpoint B analyzes that the endpoint A is a telepresence endpoint.

Step S1304: The endpoint B sends a Call proceeding message and an Altering message to the endpoint A.

Step S1306: The endpoint B sends a Connect message carrying a telepresence indicator to the endpoint A. After receiving the Connect message, the endpoint A analyzes that the endpoint B is a telepresence endpoint. Then, the two endpoints perform message interaction between the telepresence endpoints.

Figure 14:
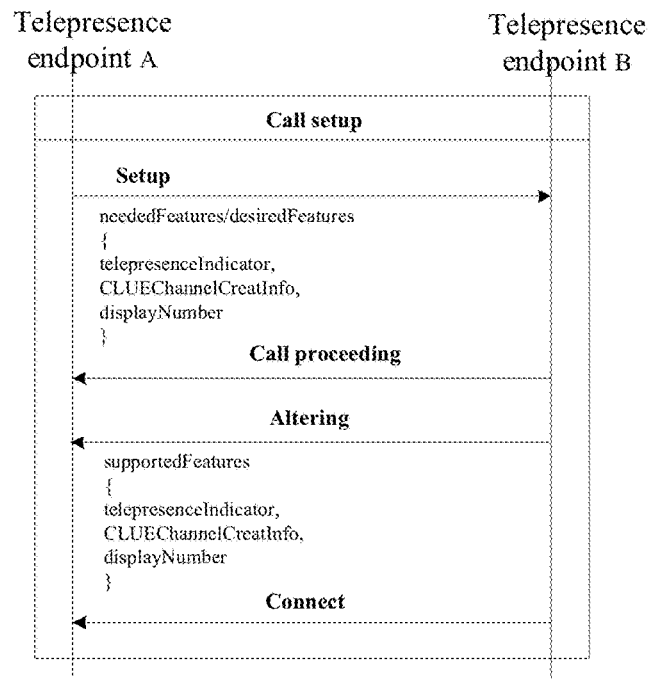
FIG. 14 is a diagram of sending an indicator 1 by H.323-based telepresence endpoints by using a Generic Extensible Framework (GEF) according to an embodiment of the present disclosure.
Figure 15:
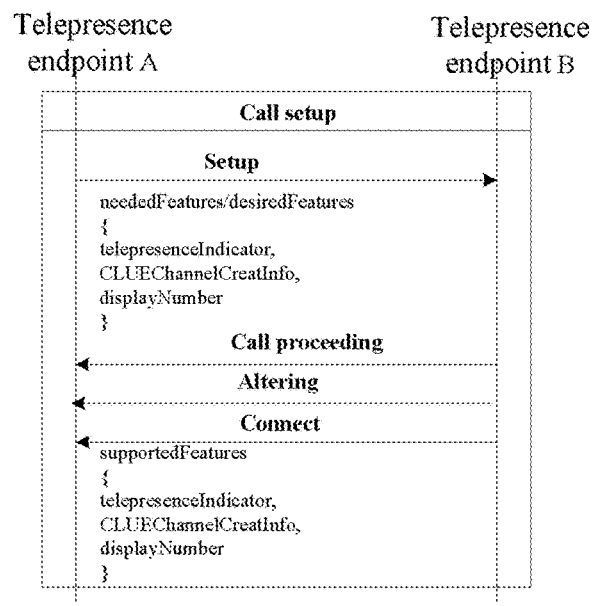
FIG. 15 is a diagram of sending an indicator 2 by H.323-based telepresence endpoints by using a GEF according to an embodiment of the present disclosure.

FIG. 14 is a diagram of sending an indicator 1 by H.323-based telepresence endpoints by using a GEF according to an embodiment of the present disclosure. FIG. 15 is a diagram of sending an indicator 2 by H. 323-based telepresence endpoints by using a GEF according to an embodiment of the present disclosure. As shown in FIG. 14 and FIG. 15, a telepresence sending endpoint may give an indicator to the endpoint by using a neededFeatures or desiredFeatures parameter in the Setup message, and a telepresence receiving endpoint may give an indicator to the endpoint by using a supportedFeatures message in the Altering message or the Connect message. For example, in FIG. 14, a setup message sent from the telepresence endpoint A to the telepresence endpoint B may be expressed as follows.

```
neededFeatures/desiredFeatures {
  telepresenceIndicator,
  CLUEChannelCreatInfo,
  displayNumber
}
```

The telepresence endpoint B and the telepresence endpoint A set up the call flow, and when the telepresence endpoint B sends prompt information to the telepresence endpoint A, the following expressions may be adopted:

```
supportedFeatures {
  telepresenceIndicator,
  CLUEChannelCreatInfo,
  displayNumber
}
```

The endpoint B sends the Connect message to the endpoint A.

In FIG. 15, the telepresence endpoint A and the telepresence endpoint B set up a call, and the setup message sent from the telepresence endpoint A to the telepresence endpoint B may be expressed as follows.

```
neededFeatures/desiredFeatures {
  telepresenceIndicator,
  CLUEChannelCreatInfo,
  displayNumber
}
```

The telepresence endpoint B and the telepresence endpoint A set up the call flow, and the telepresence endpoint B sends the prompt information to the telepresence endpoint A.

The endpoint B sends the Connect message to the endpoint A, and the following expressions may be adopted:

```
supportedFeatures {
  telepresenceIndicator,
  CLUEChannelCreatInfo,
  displayNumber
}
```

Figure 16:
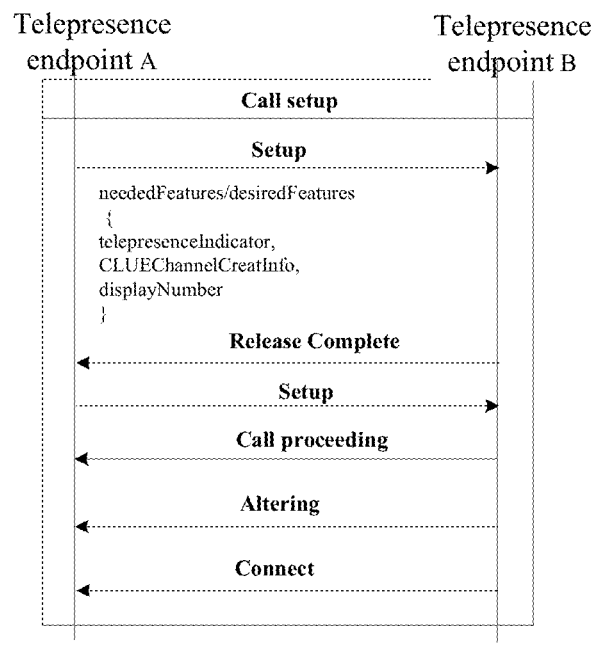
FIG. 16 is a flowchart showing the realization of compatibility between new and old devices during exchange of telepresence indicators between H.323-based telepresence endpoints when the telepresence endpoints are setting up a call according to an embodiment of the present disclosure.

Preferred embodiment 4: the realization of compatibility between new and old devices when H.323-based telepresence endpoints give endpoint indicators in a call message FIG. 16 is a flowchart showing the realization of compatibility between new and old devices during exchange of telepresence indicators between H.323-based telepresence endpoints when the telepresence endpoints are setting up a call according to an embodiment of the present disclosure. As shown in FIG. 16, the endpoint A is a telepresence endpoint, while the endpoint B is a traditional video conference endpoint. The flow includes the steps as follows.

Step S1602: The endpoint A sends a Setup message carrying a telepresence indicator to the endpoint B. The setup message may be expressed as follows.

```
neededFeatures/desiredFeatures {
  telepresenceIndicator,
  CLUEChannelCreatInfo,
  displayNumber
}
```

Step S1604: The endpoint B cannot parse the message or does not support the GEF, returns a call release message to the endpoint A, and after receiving the message, the endpoint A determines that the endpoint B is a traditional type endpoint.

Step S1604: The endpoint A re-initiates a call to the endpoint B, and sends a Setup message without an indicator.

Step S1606: The endpoint B performs normal parsing, and sends a Call proceeding message to the endpoint A.

Step S1608: The endpoint B sends an Altering message to the endpoint A.

Step S1610: The endpoint B sends a Connect message to the endpoint A. Then, the endpoint A and the endpoint B start flows such as traditional video conference endpoint negotiation.

Obviously, those skilled in the art should understand that all components or all steps in the present disclosure can be realized by using a generic computation apparatus, can be centralized on a single computation apparatus or can be distributed on a network composed of a plurality of computation apparatuses. Optionally, they can be realized by using program codes executable by the computation apparatuses, so that they can be stored in a storage apparatus and executed by the computation apparatuses. The shown or described steps may be executed in a sequence different from the above sequence under certain conditions, or they are manufactured into each integrated circuit component respectively, or a plurality of components or steps therein are manufactured into a single integrated circuit component. Thus, the present disclosure is not limited to combination of any specific hardware and software.

The above is only the preferred embodiments of the present disclosure, and is not intended to limit the present disclosure. There can be various modifications and variations in the present disclosure for those skilled in the art. Any modifications, equivalent replacements, improvements and the like within the principle of the present disclosure shall fall within the protection scope defined by the appended claims of the present disclosure.

INDUSTRIAL APPLICABILITY

As mentioned above, the method and apparatus for exchanging endpoint information and the telepresence endpoint provided by the embodiments of the present disclosure have the following beneficial effects that: the problems in the related art that the requirements of the telepresence system cannot be supported and the compatibility between the telepresence system and the traditional video conference system cannot be realized are solved, unnecessary exchange between the endpoints is avoided, and the effects of meeting the new demands of the telepresence system and improving the efficiency of media stream transport between the endpoints are further achieved.

What is claimed is:

1. A method for exchanging endpoint information, comprising:
    exchanging telepresence indicator information between telepresence endpoints;
    wherein the telepresence indicator information comprises at least one of: an endpoint type used for indicating that an endpoint is a telepresence endpoint, information of a transport channel which is to be used for transporting a telepresence capability set of the endpoint, and number of media streams received by the telepresence endpoint;
    wherein after the telepresence indicator information is exchanged between the telepresence endpoints, the method further comprises: performing telepresence capability negotiation between the telepresence endpoints according to an exchange result of the telepresence indicator information
    wherein the information of the transport channel comprises an attribute of a new channel, and the new channel comprises a CLUE channel.

2. The method as claimed in claim 1, wherein the telepresence indicator information is exchanged between the telepresence endpoints in at least one of the following modes:
    exchanging the telepresence indicator information between the telepresence endpoints when the telepresence endpoints are exchanging terminal capability sets; and
    exchanging the telepresence indicator information between the telepresence endpoints when the telepresence endpoints are setting up a call.

3. An apparatus for exchanging endpoint information, applied to a telepresence endpoint, the apparatus comprising a processor configured to execute program components stored on a memory, wherein the program components comprise:
    an exchanging component, which is configured to exchange telepresence indicator information;
    wherein the telepresence indicator information comprises at least one of: an endpoint type used for indicating that an endpoint is a telepresence endpoint, information of a transport channel which is to be used for transporting a telepresence capability set of the endpoint, and number of media streams received by the telepresence endpoint;
    wherein the program components further comprise: a capability negotiation component, which is configured to perform telepresence capability negotiation according to an exchange result of the telepresence indicator information;
    wherein the information of the transport channel comprises an attribute of a new channel, and the new channel comprises a CLUE channel.

4. The apparatus as claimed in claim 3, wherein the exchanging component comprises at least one of:
    a first exchanging unit, which is configured to exchange the telepresence indicator information when terminal capability sets are being exchanged; and
    a second exchanging unit, which is configured to exchange the telepresence indicator information when a call is being set up.

5. A telepresence endpoint, comprising an apparatus for exchanging endpoint information, wherein the apparatus comprises a processor configured to execute program components stored on a memory, the program components comprise:
    an exchanging component, which is configured to exchange telepresence indicator information;
    wherein the telepresence indicator information comprises at least one of: an endpoint type used for indicating that an endpoint is a telepresence endpoint, information of a transport channel which is to be used for transporting a telepresence capability set of the endpoint, and number of media streams received by the telepresence endpoint;
    wherein the program components further comprise: a capability negotiation component, which is configured to perform telepresence capability negotiation according to an exchange result of the telepresence indicator information;
    wherein the information of the transport channel comprises an attribute of a new channel, and the new channel comprises a CLUE channel.

6. The telepresence endpoint as claimed in claim 5, wherein the exchanging component comprises at least one of:
    a first exchanging unit, which is configured to exchange the telepresence indicator information when terminal capability sets are being exchanged; and
    a second exchanging unit, which is configured to exchange the telepresence indicator information when a call is being set up.

* * * * *